United States Patent [19]

Jaeger et al.

[11] Patent Number: 5,636,953
[45] Date of Patent: Jun. 10, 1997

[54] ROOF RAIL ATTACHMENT ASSEMBLY

[75] Inventors: Wilfred R. Jaeger, Rochester Hills; Gary G. Gordon, Southfield, both of Mich.

[73] Assignee: TRW Inc., Cleveland, Ohio

[21] Appl. No.: 661,938

[22] Filed: Jun. 11, 1996

[51] Int. Cl.$^6$ .................. F16B 13/04; F16B 39/02
[52] U.S. Cl. .................. 411/82; 411/36; 411/258; 411/930
[58] Field of Search .................. 411/34–38, 57, 411/59, 82, 258, 902, 903, 930

[56] References Cited

U.S. PATENT DOCUMENTS

| | | |
|---|---|---|
| 2,918,841 | 12/1959 | Poupitch . |
| 3,283,641 | 11/1966 | Wagner . |
| 3,381,566 | 5/1968 | Passer . |
| 3,897,713 | 8/1975 | Gugle .................. 411/930 X |
| 4,363,420 | 12/1982 | Andrews . |
| 4,391,384 | 7/1983 | Moore, III et al. . |
| 4,560,083 | 12/1985 | Danico . |
| 4,659,269 | 4/1987 | Stromiedel .................. 411/34 |
| 4,832,549 | 5/1989 | Shigayama et al. .................. 411/82 X |
| 4,932,805 | 6/1990 | Mullen et al. .................. 411/258 X |
| 5,314,280 | 5/1994 | Gagliardi et al. . |
| 5,322,400 | 6/1994 | Ford .................. 411/258 X |

*Primary Examiner*—Neill R. Wilson
*Attorney, Agent, or Firm*—Fay, Sharpe, Beall, Fagan, Minnich & McKee

[57] ABSTRACT

A fastener assembly for mounting to a panel to allow connection of associated structures thereto comprises a fastener receiving and retaining member formed of plastic and including an elongated sleeve-like body having a head end and a terminal end with a central aperture extending axially therebetween. A flange extends radially from the head end and a fastener receiving bore is carried at the terminal end in alignment with the central aperture. Radially extending retaining elements are carried on the sleeve-like body. A first set of openings is formed through the flange and a second set of openings is formed through the sleeve-like body at a location closely adjacent the flange. A sheet of temperature expandable sealer material is carried on the sleeve-like body adjacent the flange such that when the said member is mounted to a panel by extending the sleeve-like body through an opening in the panel the sheet of expandable sealer material is compressed between the flange and the panel. Thereafter, heating the assembly causes the sealer material to expand and bond the fastener in position while sealing the opening in which it is mounted.

13 Claims, 4 Drawing Sheets

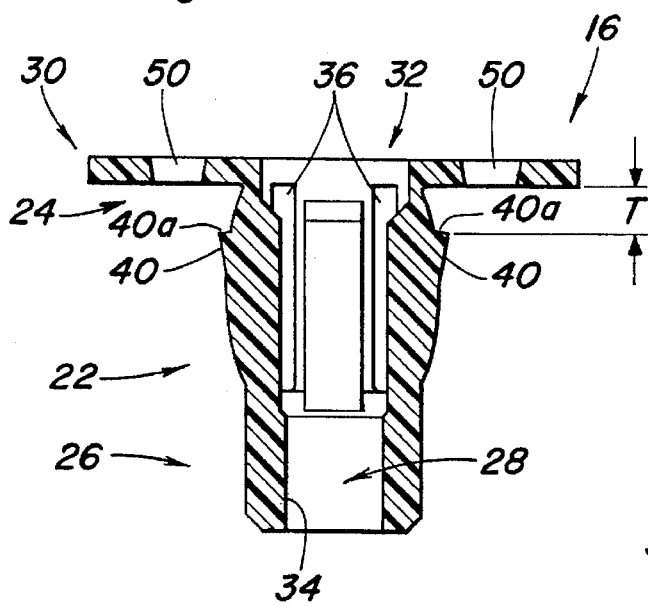
Fig. 3
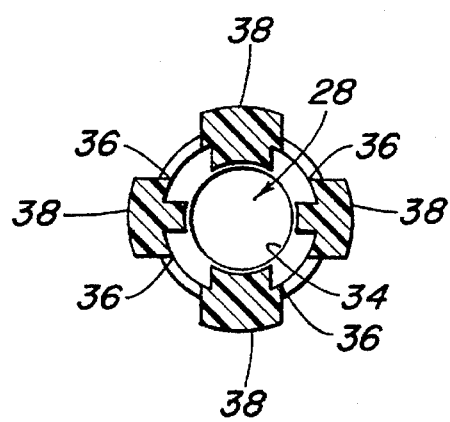
Fig. 4
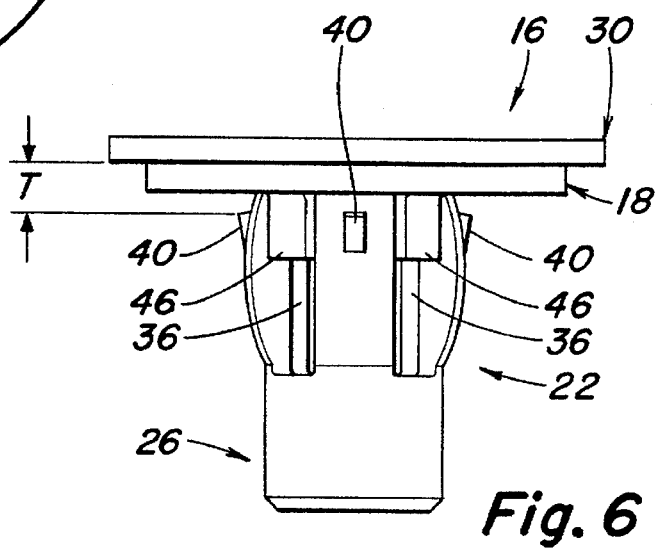
Fig. 5
Fig. 6

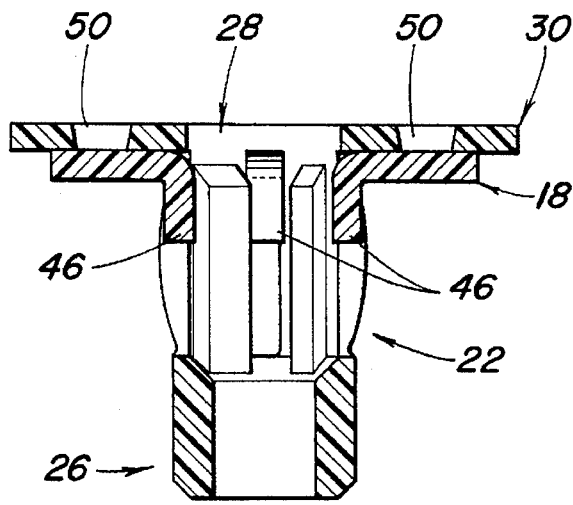
Fig. 7
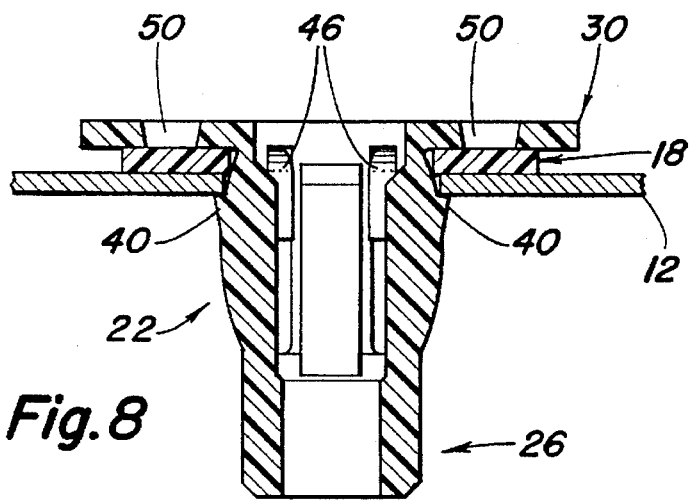
Fig. 8
Fig. 9
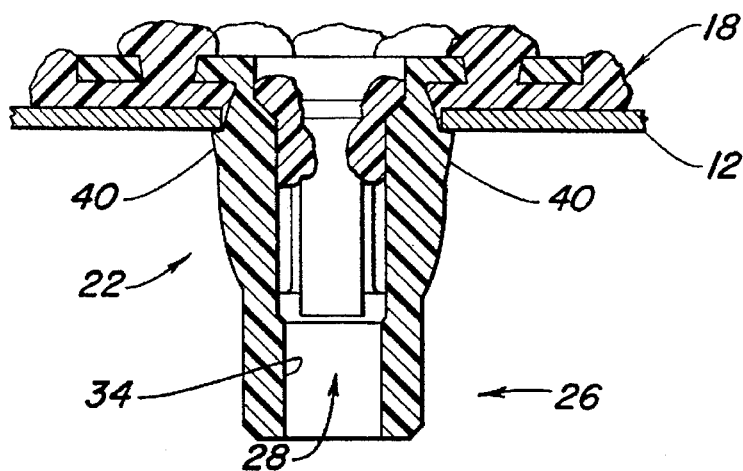

ROOF RAIL ATTACHMENT ASSEMBLY

BACKGROUND OF THE INVENTION

The subject invention is directed toward the fastener art and, more particularly to an assembly for connecting associated components to relatively thin panels.

The invention is especially suited for use in the vehicle art for connecting various structures to vehicle body panels and will be described with respect thereto; however, as will become apparent, the invention is capable of broader application and could be used in many different environments for a variety of purposes.

In the manufacture of motor vehicles, it is frequently necessary to attach various structural and accessory components to sheet metal body panels. For example, roof rails have commonly been attached to the sheet metal roof panel through the use of expansible metal fasteners. Typically, the fasteners have comprised a tubular body having a flange at one end and an internally threaded portion at the other end. The fasteners are inserted through openings in the roof panel with the tubular body extending interiorly of the panel and the flange resting against the exterior surface of the panel. The barrel is arranged to radially expand and lock the fastener in the panel opening when a screw is threaded into the barrel.

The arrangement described is generally satisfactory but does suffer from certain disadvantages. The primary disadvantage is that the screw must be installed twice. First when the tubular body is expanded and again after the vehicle has been painted and the roof rail is being installed. If excessive torque is applied to the screw, the fastener can sometimes rotate resulting in an installation that can rattle and leak.

SUMMARY OF THE INVENTION

The subject invention provides a fastener arrangement which overcomes the problems noted above and greatly facilitates the installation and mounting of an associated structure to a metal body panel. In particular, according to the invention, the assembly generally includes a fastener assembly intended to be mounted to a sheet metal panel having first and second oppositely disposed surfaces with an opening extending through the panel between the first and second surfaces. A fastener receiving and retaining member formed of plastic and including an elongated sleeve-like body having a head end and a terminal end with a central aperture extending therebetween is positioned such that the sleeve-like body extends through the panel opening. A flange extends radially from the head end and a fastener receiving bore is formed in the terminal end in alignment with the central aperture. Retaining elements extend radially from the sleeve-like body. The retaining elements act to engage the second surface of the panel to retain the member in the panel opening. The flange overlies the first surface of the panel and a sheet of expandable sealer material is compressed between the flange and the panel. The expandable sealer material is capable of undergoing substantial expansion and melting and acts to bond the flange to the panel when heated above a predetermined temperature. The predetermined temperature is lower than a temperature that would damage the fastener receiving and retaining member.

Preferably and in accordance with a more limited aspect of the invention, the flange includes a plurality of extrusion openings extending therethrough such that when the assembly is subjected to the predetermined temperature, the expansible sheet material expands outwardly and extrudes through the openings. The material acts to bond the flange to the first surface of the panel upon cooling and, further, the protrusions which extrude through the flange openings provide a resilient gasket-like arrangement on the upper or outer surface of the flange.

In its preferred form, the sleeve-like body is arranged so as to expand radially when forces are applied to compress the terminal end toward the head end. In use, a threaded fastener inserted from the head end through the central aperture into threaded engagement with the fastener receiving bore portion acts to so compress the sleeve-like body when it is tightened into the opening during the fastening of an associated accessory component, such as a roof rail, to the fastener assembly.

In accordance with a still more limited aspect of the invention, a second set of extrusion openings is provided through the sleeve-like body at a location closely adjacent the flange such that the expandable sealer material that is compressed between the flange and the panel can extrude radially inward into the central aperture and function as a sealant about the threaded fastener. The presence of the expandable sheet material between the flange and the first surface of the panel acts as both a sealant and a bonding agent. This generally eliminates rattles or the like. Moreover, the portions of the material which extrude through the openings in the flange and into the central part of the bore act both as a gasket to prevent rattles and a sealant against water and dirt infiltration.

The assembly requires only a manual or machine insertion into the panel opening and the final expansion of the sleeve-like body does not take place until the actual installation of the associated accessory components such as the roof rail. A single installation of a threaded mounting screw causes the necessary final expansion to firmly and fully mechanically lock the assembly in position in the panel. The unit is thus both adhesively bonded and mechanically joined to the panel.

As can be seen from the foregoing, a primary object of the invention is the provision of a fastener assembly which can be used for fastening various associated structures to metal panels or the like.

A further object is a provision of a fastener assembly of the type described that is extremely simple to install and which allows final locked engagement to take place during the installation of the associated structure being mounted to the panel.

Yet another object of the invention is the provision of a fastener assembly of the type described wherein a bonding and sealing takes place when the assembly is raised to a relatively low predetermined temperature.

A still further object of the invention is a provision of an assembly as described which requires a minimum number of components and which can be molded of plastic.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIGS. 3 and 4 are cross-sectional views taken on lines 3—3 and 4—4, respectively, of FIG. 2;

FIG. 5 is a top plan view of the fastener receiving and retaining member;

FIG. 6 is a side elevational view similar to FIG. 3 but showing the fastener retaining element associated with a sheet of expandable sealer material;

FIG. 7 is a vertical cross-sectional view through the FIG. 6 assembly;

FIG. 8 is a cross-sectional view of the FIG. 6 assembly mounted into the vehicle body panel but prior to the application of the predetermined temperature level;

FIG. 9 is a showing like FIG. 8 but illustrating the assembly after the expandable sheet material has been expanded through the application of the predetermined temperature;

DETAILED DESCRIPTION OF THE PREFERRED EMBODIMENT

Figure 1:
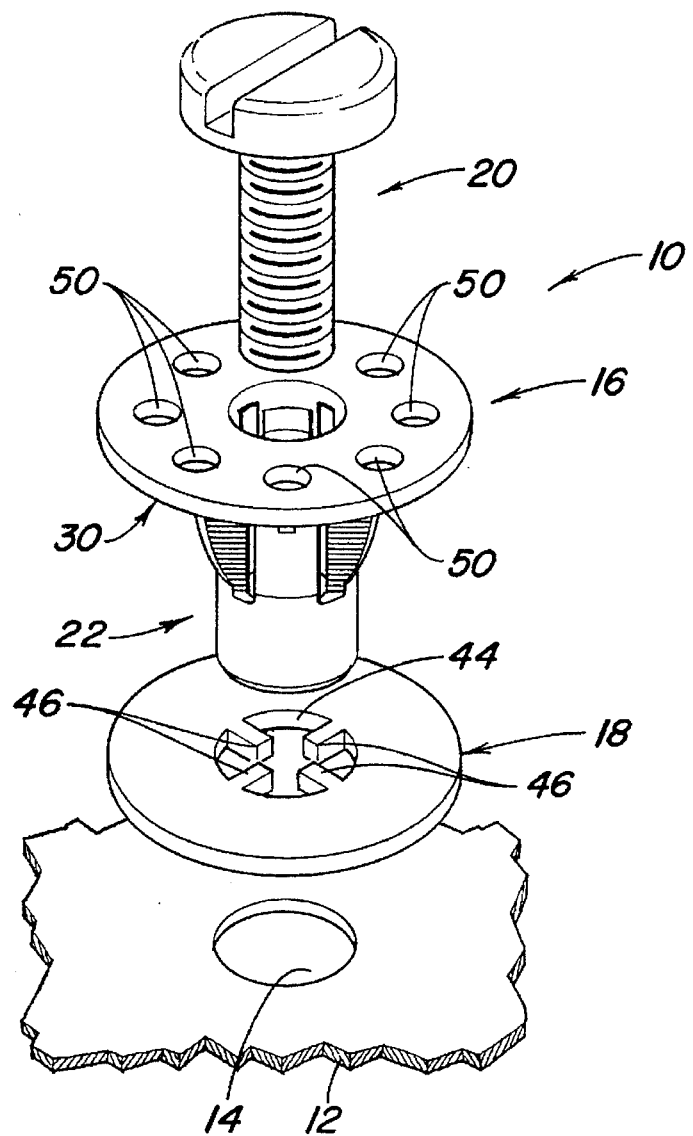
FIG. 1 is an exploded isometric view showing the various components of the assembly associated with a vehicle body panel.
Figure 2:
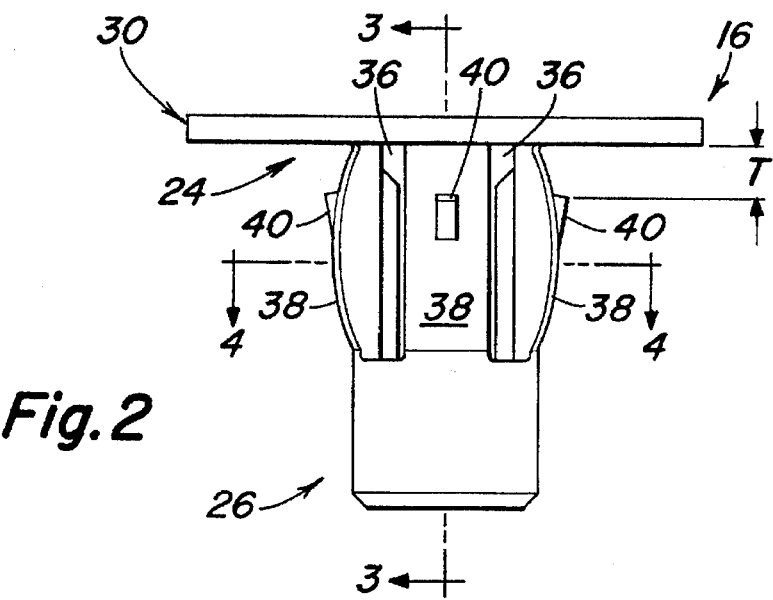
FIG. 2 is a side elevational view of the molded plastic fastener and retaining member used in the preferred form of the assembly.

Referring now to the drawings wherein the showings are for the purposes of illustrating the preferred embodiment of the invention only and not for purposes of limiting same, FIG. 1 shows the overall assembly in exploded pictorial view associated with a sheet metal vehicle body panel 12 having a mounting hole 14 formed there through. The components of the assembly comprise a fastener receiving and retaining element 16, a disk or sheet of expandable sealant material 18 and a screw 20 which is preferably a thread cutting screw. The preferred construction and arrangement of the member 16 is best illustrated in FIGS. 2–4. As shown therein, member 16 generally comprises a tubular, sleeve-like main body 22 having a head end 24 and a lower or terminal end 26. A central aperture 28 extends generally axially through body 22.

At the head end 24 of body 22 there is a radially extending flange 30. Flange 30 is, in the preferred embodiment, of circular configuration and has a central opening 32 which opens to, and is in alignment with, the aperture 28 of body 22. The lower end of the central aperture 28 is of somewhat lesser diameter and forms a fastener receiving bore 34 whose function and design will subsequently be described in somewhat greater detail. Extending in a vertical direction and opening completely through the sidewall of the body portion 22 are four (See FIG. 4) vertically arranged slots 36. As illustrated in FIGS. 2 and 3, the slots 36 extend from a location just under the flange 30 to a point slightly above the reduced diameter portion containing fastener receiving bore 34. The slots 36 act to divide the body section 22 into four relatively rigid legs 38 which are spaced 90° apart as can be seen in FIG. 4. In its preferred form, the legs 38 are relatively thicker in their midsection as can be seen in FIGS. 2 and 3. Additionally, each of the legs carry a radially extending retaining tab 40 configured as shown and having an upper catch face 40a which is located a distance T from the underside of the flange 30 (See FIG. 3).

The member 16 could be formed from a variety of different materials but is preferably injection molded from a suitable high strength and relatively rigid plastic such as a nylon.

Associated with the member 16 and arranged to be closely received on the body 22 is the previously mentioned sheet or disk 18. The disk 18 is formed from an expansible sealant material which melts and undergoes substantial volumetric expansion when subjected to a temperature in the range above approximately 140° C. This temperature is well within the minimum temperatures to which vehicles are subjected when taken through paint curing ovens during manufacture. Expansible sealant materials useful herein are well known and include thermoplastic elastomers and particularly, polyolefins such a ethylene, propylene copolymers, polyethylene, ethylene copolymers, terpolymers, ionomers, polyvinylchloride polymers, and styrene-butadiene block copolymers. The material is filled with a conventional chemical blowing agent or physical foaming agent which foams and undergoes considerable permanent volumetric expansion, as much as 75% and more, when exposed to elevated temperatures. The gasket material should also be water and solvent resistant.

Preferably, the gasket material undergoes gradual cross linking during exposure to elevated temperatures. Because this cross linking provides a slowly increasing melting point and an increasing resistance to flow, there is a reduced chance that the gasket material will melt out if the material is subjected to excessively long periods of high temperature through accident, inadvertence, or the like. The cross linking also increases the resistance of the gasket material to solvents such as gasoline or oil.

The preferred shape and configuration of the disk 18 of expansible material can best be seen in FIG. 1. As shown therein, it has a generally circular shape with an outer periphery that is similar in diameter to the diameter of the flange 30. The central portion of the disk 18 is provided with a through opening 44 having a general size and shape to correspond to the exterior of the body 22. Additionally, however, the inner periphery of the disk has four inwardly extending tab portions 46 spaced, sized and arranged so as to generally be capable of entering into the openings 36 on body 22. As generally shown in FIGS. 6 and 7, when the disk 18 is placed on body 22 and moved into engagement with the underside of flange 30, the tabs 46 are arranged so that they generally align with or enter into the openings 36. The reason and desirability of this relationship will subsequently become apparent. As can be seen from FIGS. 1 and 7, the flange 30 is preferably provided with openings 50 that are located so as to overlie the disk 18.

The installation and use of the assembly thus far described can best be understood by reference to FIGS. 8 and 9. FIG. 8 shows how the member 16 and the associated disk 18, in the form shown assembled in FIG. 7, are installed into the opening 14 in panel 12. As illustrated therein, the components are inserted through the opening 14. It is, of course, understood that the diameter of opening 14 relative to the body section 22 is sized so that a close and relatively tight fit is achieved so that a slight radially inward compression of the body allows it to be moved to the seated position shown in FIG. 8. In this position, the tabs 40 are engaged about the edge of the hole 14 with their retaining faces 40a in engagement with the lower or second face surface of the panel. The distance "T" between the retaining tabs 40 and the undersurface of the panel is selected such that disk 18 is slightly compressed between the underside of flange 30 and the first or upper surface of the panel 12. At this time, the tab portions 46 of disk 18 are positioned about the interior of the opening 14 as illustrated in FIG. 8.

The insertion of the member 16 and the disk 18 into its mounted position of FIG. 8 can be accomplished through the use of automatic equipment or manually without the use of tools. Once inserted, the assembly passes with the vehicle body through further processing steps and ultimately enters the paint curing ovens at which time the temperature rises to a temperature above the melting and expansion temperature of the disk 18. This causes the disk 18 to melt and undergo significant expansion as illustrated in FIG. 9. The member 16 is thus bonded to the flange 30. Additionally, the material expands upwardly through the openings 50 which results in the beads of sealant material rising above the top surface of flange 30 in the manner shown. Also, the tabs 46, when melted and expanded, enter into the central aperture 28 as illustrated.

When it is desired to assemble an associated accessory element to the roof through the use of the assembly of FIG. 9, a screw is inserted downward through central aperture 28 into the fastener receiving bore 34. The bore 34 can be internally threaded or it can be a smooth bore to receive a thread-cutting fastener.

Figure 10:
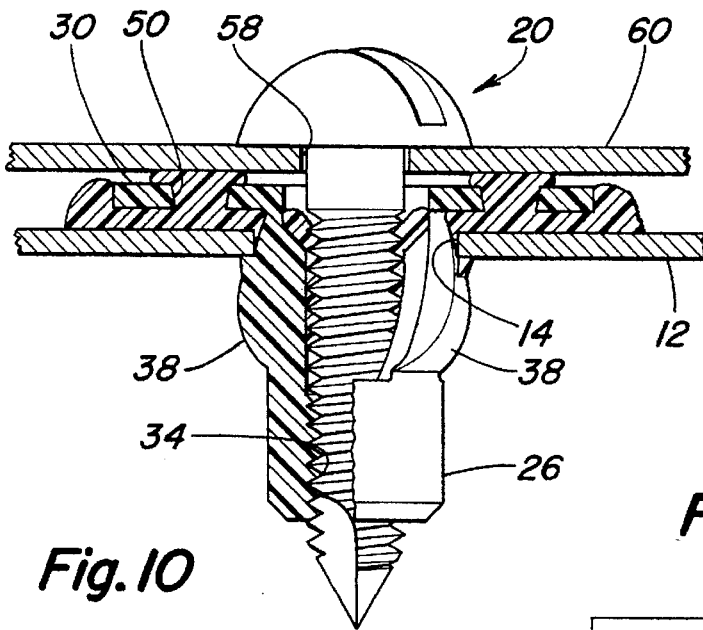
FIG. 10 is a view showing the assembly in its final installed position with the associated accessory elements attached thereto.

FIG. 10 illustrates a thread-cutting fastener 20 passing through an opening 58 in a roof rail member 60 downwardly into engagement with the fastener receiving bore 34. Tightening of fastener 20 into its mounted position shown in FIG. 10 compresses the roof rail into engagement with the beads of sealant material extending upwardly through openings 50 in flange 30. The material thus acts in the nature of a gasket or sealant to reduce the likelihood of rattles. Additionally, the screw 20 passes through the sealant material which is extruded through openings 36 and into the aperture 28 as best illustrated in FIG. 9. This acts as a sealant about the screw and offers further vibration resistance to the assembly.

Referring again to the shape and configuration of the legs 38 as shown and described with reference to FIGS. 2–4, it should be noted that the legs have a relatively rigid midsection but are of reduced thickness and strength where they join at the first end of body 22 under flange 18 as well as where they join with lower end portion 26. As the screw 20 is tightened into its final located position. The torque generated on the terminal end 26 causes it to rotate to twist legs 38 and drive them outwardly and somewhat collapsing them in the condition illustrated generally in FIG. 10. This further locks the assembly in position in opening 14 of panel 12.

Note that the entire fastener assembly is installed and the roof rail member 60 attached while driving in screw 20 only once. The assembly can be disassembled merely by removing the screw and reassembly can take place without further modification merely by reinstalling the screw.

Figure 11:
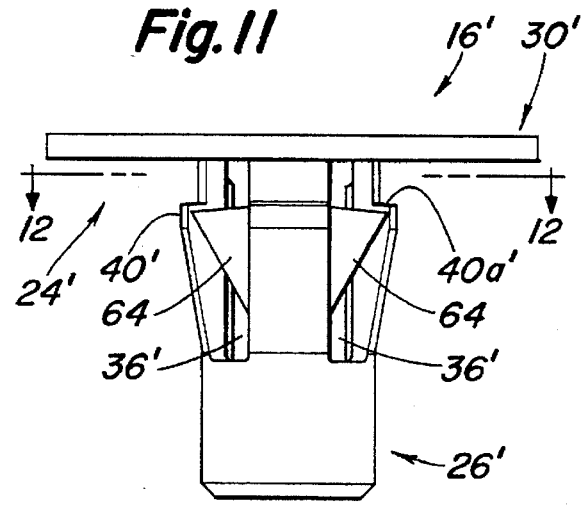
FIG. 11 is a view like FIG. 2 but showing a modified form of the plastic fastener and retaining member.
Figure 12:
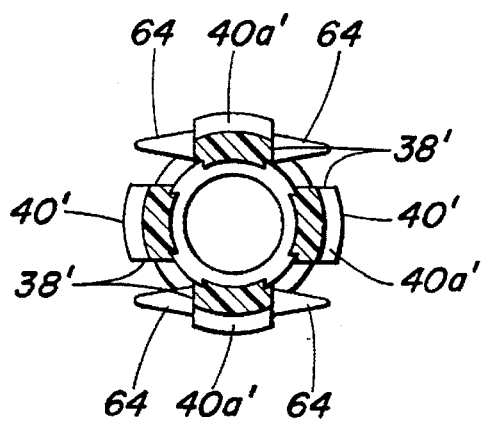
FIG. 12 is a cross-sectional view taken on line 12—12 of FIG. 11.
Figure 13:
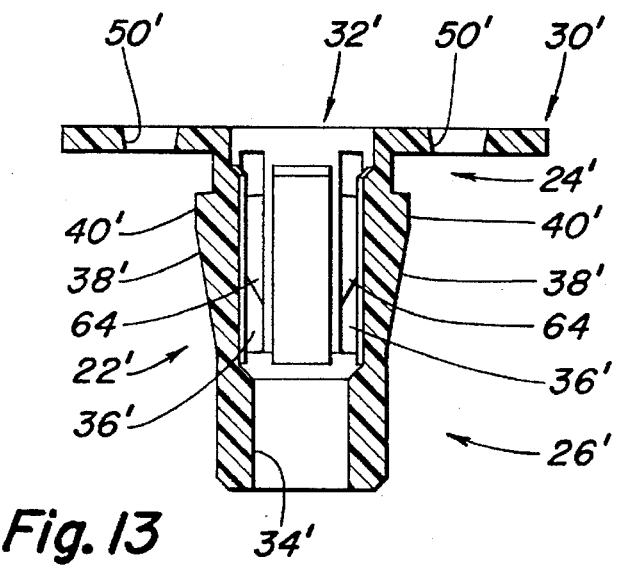
FIG. 13 is a vertical cross-sectional view of the plastic fastener and retaining member of FIG. 11.

FIGS. 11–13 show a modified form of the plastic fastener and retaining member portion of the assembly. In most particulars, the form shown in FIGS. 11–13 is substantially the same as that previously described with respect to FIGS. 2–4. Consequently, in the FIGS. 11–13 embodiment, the same reference numerals used in the FIGS. 2–4 embodiment have been used but differentiated by the addition of a prime (') suffix. The various elements so identified are to be taken as the same as those correspondingly numbered and described with respect to the FIGS. 2–4 embodiment unless otherwise noted.

The primary difference between the embodiment of FIGS. 11–13 and the embodiment of FIGS. 2–4 resides in the central portion of the main body. In particular, the legs 38' are relatively straighter and do not include the thicker midsection previously described. Rather, the legs 38' taper gradually upward to the retaining tabs 40'. However, in order to increase the holding power when the member is finally installed, there are provided outwardly extending wing-like members 64 that are located on laterally opposite sides of a diametrically opposed pair of the legs 38'. These wings have a generally triangular shape as illustrated best in FIG. 11. Additionally, in FIG. 12, it will be seen that they taper from a relatively thick base to a thinner outer edge. The top surfaces of the wings 64 are located generally at the same elevation as the retaining faces 40a' of tabs 40'. When originally installed, the top surfaces of wings 64 thus function in much the same manner as the top surfaces 40a' of tabs 40'. Additionally, however, when the screw member 20 is tightened into its final located and engaged position, the torque generated that rotates the bottom end 26' of the member twists the legs 38' causing the wings 64 to be driven to a more radially directed position which further locks the assembly in position in the opening 14 of panel 12.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In combination:

a) a panel having first and second oppositely disposed face surfaces with an opening extending through the panel between the first and second face surfaces;

b) a fastener receiving and retaining member formed of plastic and including an elongated sleeve-like body having a head end and a terminal end with a central aperture extending therebetween, a flange extending radially from the head end and a fastener receiving bore carried at the terminal end in alignment with the central aperture, said central body carrying radially extending retaining tabs at a location spaced from the flange a distance substantially equal to the thickness of the panel;

c) said fastener receiving and retaining member having its elongated body extending through the opening in the panel with the flange overlying the first face surface and the retaining tabs engaged with the second face surface; and, d) a sheet of expandable sealer material compressed between the flange and the panel, said expandable sealer material being capable of undergoing substantial expansion and melting and acting to bond the flange to the panel when heated above a predetermined temperature, the predetermined temperature being lower than a temperature that would damage the fastener receiving and retaining member.

2. The combination as set forth in claim 1 wherein the flange includes a first set of extrusion openings through which the sealer material can extrude when heated above said predetermined temperature.

3. The combination as set forth in claim 2 including a second set of extrusion openings extending through the wall of the sleeve-like body adjacent the flange to permit extrusion of the sealer material into the central aperture when heated above said predetermined temperature.

4. The combination as set forth in claim 1 wherein the sleeve-like body includes retainer means between the head end and the terminal end for expanding radially upon application of forces to the sleeve-like body to compress the terminal end toward the head end.

5. The combination as set forth in claim 4 including a threaded fastener extending through the central aperture from the head end into engagement with the fastener receiving bore carried at the terminal end.

6. The combination as set forth in claim 4 wherein there are a first set of extrusion openings through the flange to permit expansion of the expandable sealer material therethrough when heated above said predetermined temperature.

7. The combination as defined in claim 6 including a second set of extrusion openings through the sleeve-like body at a location closely adjacent the flange to permit expansion of the expandable sealer material therethrough into the central aperture when heated above said predetermined temperature.

8. A fastener assembly for mounting to a panel to allow connection of associated structures thereto comprising:

a fastener receiving and retaining member formed of plastic and including an elongated sleeve-like body having a head end and a terminal end with a central aperture extending axially therebetween, a flange extending radially from the head end, a fastener receiving bore carried at the terminal end in alignment with the central aperture, retaining elements on the sleeve-like body, a first set of openings through the flange and a second set of openings through the sleeve-like body at a location closely adjacent the flange; and a sheet of expandable sealer material having the sleeve-like body of the fastener receiving and retaining member extending therethrough such that when the said member is mounted to a panel by extending the sleeve-like body through an opening in the panel the sheet of expandable sealer material is compressed between the flange and the panel.

9. The assembly as defined in claim 8 wherein sheet of expandable sealer material has portions extending into said second set of openings.

10. The assembly as defined in claim 8 wherein the second set of openings are relatively uniformly spaced about the sleeve-like body.

11. The assembly as defined in claim 8 wherein the sleeve-like body includes elongated slots forming said second set of openings.

12. The assembly as defined in claim 8 wherein said retaining elements comprise wing-like elements extending from said sleeve-like body adjacent said first set of openings.

13. The assembly as defined in claim 8 wherein said first set of openings extend axially of said sleeve-like body.

\* \* \* \* \*